United States Patent [19]
Watanabe et al.

[11] Patent Number: 4,748,138
[45] Date of Patent: * May 31, 1988

[54] HIGHLY TOUGHENED, SINTERED MASS OF ZIRCONIA

[75] Inventors: Masakazu Watanabe, Nagoya; Satoshi Iio, Komaki; Yasushi Matsuo, Nagoya, all of Japan

[73] Assignee: NGK Spark Plug Co., Ltd., Nagoya, Japan

[*] Notice: The portion of the term of this patent subsequent to Dec. 2, 2003 has been disclaimed.

[21] Appl. No.: 630,358

[22] Filed: Jul. 16, 1984

Related U.S. Application Data

[63] Continuation-in-part of Ser. No. 454,260, Dec. 29, 1982, abandoned.

[30] Foreign Application Priority Data

Jan. 9, 1982 [JP] Japan .................................. 57-1966

[51] Int. Cl.⁴ ..................... C04B 35/48; C04B 35/56; C04B 35/58
[52] U.S. Cl. ......................................... 501/87; 501/88; 501/89; 501/92; 501/96; 501/103; 501/104; 501/105
[58] Field of Search ....................... 501/88, 89, 92, 96, 501/103, 104, 105, 97, 87

[56] References Cited

U.S. PATENT DOCUMENTS

| | | | |
|---|---|---|---|
| 3,652,304 | 3/1972 | Daniels | 501/96 |
| 4,218,253 | 8/1980 | Dworak et al. | 501/92 |
| 4,221,650 | 9/1980 | Friese et al. | 501/105 |
| 4,316,964 | 2/1982 | Lange | 501/105 |
| 4,360,598 | 11/1982 | Otagiri et al. | 501/103 |
| 4,525,464 | 6/1985 | Claussen | 501/105 |
| 4,626,517 | 12/1986 | Watanabe | 501/103 |

FOREIGN PATENT DOCUMENTS 2741295 3/1979 Fed. Rep. of Germany.
2744700 4/1979 Fed. Rep. of Germany.

*Primary Examiner*—Mark L. Bell
*Attorney, Agent, or Firm*—Wegner & Bretschneider

[57] ABSTRACT

Ceramic sintered mass having a mean grain size of no more than 3 microns of high toughness even at high temperatures is obtainable, the mass comprising 30–99.5% by weight of a component A as defined below and the balance being a component B as defined below:

Component A: zirconia having a tetragonal and/or cubic system content of no less than 90% by weight, with the proviso that the tetragonal/cubic system ratio by weight is no less than 0.25, said zirconia including a stabilizer of $Y_2O_3$, CaO, MgO, etc.

Component B: one or more of borides, carbides and nitrides of Al, Si and an element in the groups 4a, 5a and 6a of the periodic table, and $Al_2O_3$.

The balance may incorporate a further component C, such as $SiO_2$, $Fe_2O_3$ and $TiO_2$ and the like of no more than 3% by weight in the sintered mass.

32 Claims, 2 Drawing Sheets

High Temperature Bending Strength

High Temperature Bending Strength

HIGHLY TOUGHENED, SINTERED MASS OF ZIRCONIA

This application is a continuation-in-part application of U.S. application Ser. No. 454,260, filed Dec. 29, 1982, abandoned.

FIELD OF THE TECHNOLOGY AND BACKGROUND

The present invention relates to a highly toughened, sintered mass of zirconia containing $ZrO_2$ as the main component.

The greatest disadvantage of ceramic materials was their poor bending strength. An appreciable number of experts in the art have been involved in this problem, since improvements in bending strength have been considered to make it possible to use, with marked effect, those materials for cutting tools and artificial aggregates as well as parts for internal combustion engines.

For instance, Japanese Patent Kokai-Publication No. 55-140762 entitled A CUTTING TOOL MATERIAL OF THE ZIRCONIA TYPE discloses sintered zirconia partially stabilized with oxides of Y, Ca, Mg, etc., and teaches that it has a crystal phase including 60-95% by weight of the tetragonal and isometric systems in total. An article by J. S. Reed published in "Ceramic Bulletin", Vol. 55, pp. 717 (1976), U.S.A., describes that high-strength $ZrO_2$ sintered masses are obtained by co-precipitating a mixture of $ZrOCl_2$ and $YCl_3$ and calcining the resulting powder, then sintering the fine calcined powder of $ZrO_2$ stabilized with $Y_2O_3$. However, none of these materials are found to be satisfactory in respect of the strength. Thus, there is a strong demand for further increase in the strength, which will enable wider utilization coverage.

SUMMARY OF THE DISCLOSURE

A main object of the present invention is to provide a novel zirconia-base sintered mass of high toughness and strength.

Another object of the present invention is to provide a zirconia-base sintered mass of high toughness and strength, which has an increased tetragonal $ZrO_2$ content.

The first aspect of the present invention provides a ceramic press-sintered mass of high toughness characterized in that it is essentially consisting of 30-99.5% by weight of a component A as defined below and the balance being a component B as defined below, and has a mean grain size of no more than 3 microns as a whole:

Component A:
zirconia having a tetragonal and/or cubic system content of no less than 90% by weight, with the proviso that the tetragonal/cubic system ratio by weight is no less than 0.25, said zirconia including a stabilizer consisting of one or more selected from the group consisting of $Y_2O_3$, CaO, MgO, $Yb_2O_3$ CeO and the like;

Component B:
one, or a mixture of two or more substances selected from the group consisting of borides, carbides and nitrides of Al, Si and an element in the groups 4a, 5a and 6a of the periodic table.

The second aspect of the present invention also provides a highly toughened, press-sintered mass of ceramics wherein said balance includes the component B and a further component C as follows:

Component C:
3% by weight or less of $SiO_2$, 0.5% by weight or less of $Fe_2O_3$ and/or 0.5% by weight or less of $TiO_2$, provided that the component C amounts to no more than 3% by weight in said sintered mass.

The third aspect of the present invention provides a ceramic press-sintered mass of high toughness consisting essentially of 30–95% by weight of a component A as defined below and the balance being a component B as defined below, and having a mean grain size of no more than 3 microns as a whole:

Component A:
zirconia having a tetragonal and/or cubic system content of no less than 90% by weight, with the proviso that the tetragonal/cubic system ratio by weight is no less than 0.25, said zirconia including a stabilizer consisting of one or more selected from the group consisting of $Y_2O_3$, CaO, MgO, $Yb_2O_3$ and CeO; and Component B:
a mixture of $Al_2O_3$ and at least one substance selected from the group consisting of borides, carbides and nitrides of Al, Si and an element in the groups 4a, 5a and 6a of the periodic table, wherein said substance is present 4% by weight or more and $Al_2O_3$ is present 0.1% by weight or more, respectively, of the whole components.

The same as the second aspect of the present invention is applied for the third aspect resulting in the fourth aspect of the present invention.

According to the present invention, compacts of the fine starting materials with the specified composition are press-sintered under the conditions of a temperature of 1300°–1600° C., a high pressure of 1300°–1600° C. for a period of time such that the mean grain size becomes at most 3 microns. The press-sintering is preferably conducted by hot-pressing, however other press-sintered manners such as hot isostatic pressing (HIP) may be employed as well. The starting materials of the component A are preferably prepared by co-precipitation from the aqueous solutions of water-soluble salts of the constituent elements thereof.

DETAILED DESCRIPTION OF THE PREFERRED EMBODIMENTS

Figure 1:
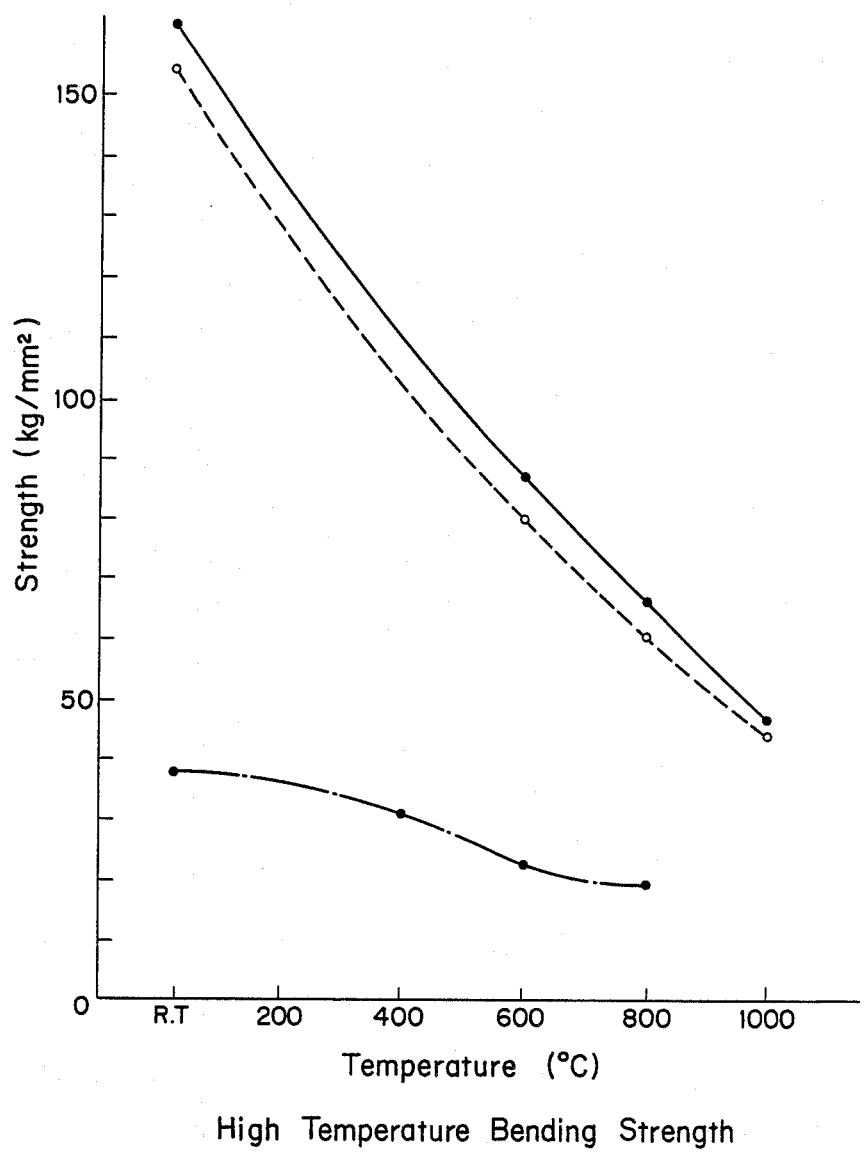
FIG. 1 is a graph obtained by plotting the measurements for the high temperature bending strength in Example 5 as ordinate against temperature as abscissa, wherein the solid line denotes Sample No. 5R of Example 1, the broken line Sample No. 33 of Example 4, and the chained line a sample of commercially available partially stabilized zirconia.

In Japanese Patent Application Nos. 56-127004 and 56-127005 as well as Japanese Patent Application No. 56-132934, the applicant presented as highly-toughened, sintered masses of zirconia some of the results obtained due to an effort to attain the above-mentioned objects. In other words, the applicant discovered that the temperature at which tetragonal zirconia transforms into monoclinic zirconia can be lowered by allowing $Al_2O_3$ or TiN to form a solid solution with, and disperse in, a $ZrO_2$ matrix, whereby the grain growth of zirconia is so restrained that the content of tetragonal zirconia increases with resulting increases in slip resistance at the grain interfaces of zirconia resulting in increase in strength, which will double at higher temperatures.

However, although the sintered masses referred to in the foregoing applications had their density reaching nearly the theoretically possible value, there were still a slight number of micropores. Besides, what was allowed for dispersion in the zirconia matrix, was limited to those materials having strong ionic bond, such as $Al_2O_3$ or TiN that could be sintered under the normal pressure.

To obtain further improved zirconia-base ceramic sintered masses on the basis of the aforesaid findings, sintering testing has been carried out with a variety of materials dispersed in zirconia, using hot-pressing. As a result, it has been found that a sintered mass is obtained, which is substantially free from any micropore, and has a strength of as high as about 160 kg/mm$^2$ that has not been possibly attained with the conventional ceramic materials.

Such findings underlie the present invention.

In what follows, % is given by weight unless otherwise specified. The component B (dispersant material) such as $Al_2O_3$ is poorly effective when applied in an amount of below 0.5%. When it is applied in an amount exceeding 70%, the content of zirconia taking part in toughness is so reduced that both toughness and strength become unsatisfactory.

Zirconia should have its crystal phase comprised of 90% by weight or higher of the tetragonal and cubic systems in total, since a lowering of toughness takes place below that lower limit. The tetragonal/cubic system ratio by weight should then be no less than 0.25, since a lowering of toughness is also observed below that value.

The sintered mass obtained according to the present invention should have an average grain size of no more than 3 microns, since the tetragonal system is transformed into the monoclinic system above that value, resulting in a lowering of toughness.

The sintered mass of the present invention may include a further component C up to 3% in total, i.e., up to 3% $SiO_2$, up to 0.5% $Fe_2O_3$ and/or up to 0.5% $TiO_2$. Above those amounts sintering is adversely affected entailing a drop in toughness. It is presumed that the component C would partly act as a sintering agent, however, those components may be present as impurities, too.

It is noted that the same results are obtained even when $ZrO_2$ is partly or wholly replaced with $HfO_2$. The replacement of $ZrO_2$ with $HfO_2$ is generally admitted in the art, as disclosed in, e.g., Advances in Ceramics, Vol.3, Science and Technology of Zirconia, A. H. Heuer and L. W. Hobbs pp. 164–167 "Phase transformation of solid solution of $ZrO_2$ and $HfO_2$ in an $Al_2O_3$ matrix".

The elements from Groups 4a, 5a and 6a of the periodic table, as included in the component B according to the present invention, refer to Ti, Zr, Hf; V, Nb, Ta; and Cr, Mo, W, as given in the Periodic Table, Elements of Physical Chemistry, 1960, D. Van Nostrand Co., Inc. (Maruzen Asian Edition pp.163).

According to the first aspect of the present invention, suitable examples of the substances constituting the component B include TiC, NbC, $TiB_2$, TiN, SiC, $Si_3N_4$ or WC, or a mixture of two or more thereof; more preferably TiC, TiN, SiC or $Si_3N_4$, or a mixture thereof.

According to the third aspect of the present invention, suitable examples of the substances constituting the component B is a mixture of $Al_2O_3$ and at least one of the suitable substances for the first aspect hereinabove mentioned. $Al_2O_3$ is incorporated in the 3rd and 4th aspects of the present invention as the component B of the combination of $Al_2O_3$ and the other substances provides more improved results in comparison with the case where $Al_2O_3$ alone is incorporated as the component B.

In the 3rd and 4th aspects, $Al_2O_3$ should be present at least 0.1% by weight in the whole sintered mass so as to ensure the effect of the $Al_2O_3$ incorporation, while the substances other than $Al_2O_3$ constituting the components B should be present at least 4% by weight so as to ensure the improved effect of the incorporation thereof with $Al_2O_3$ (see Table 7).

Figure 2:
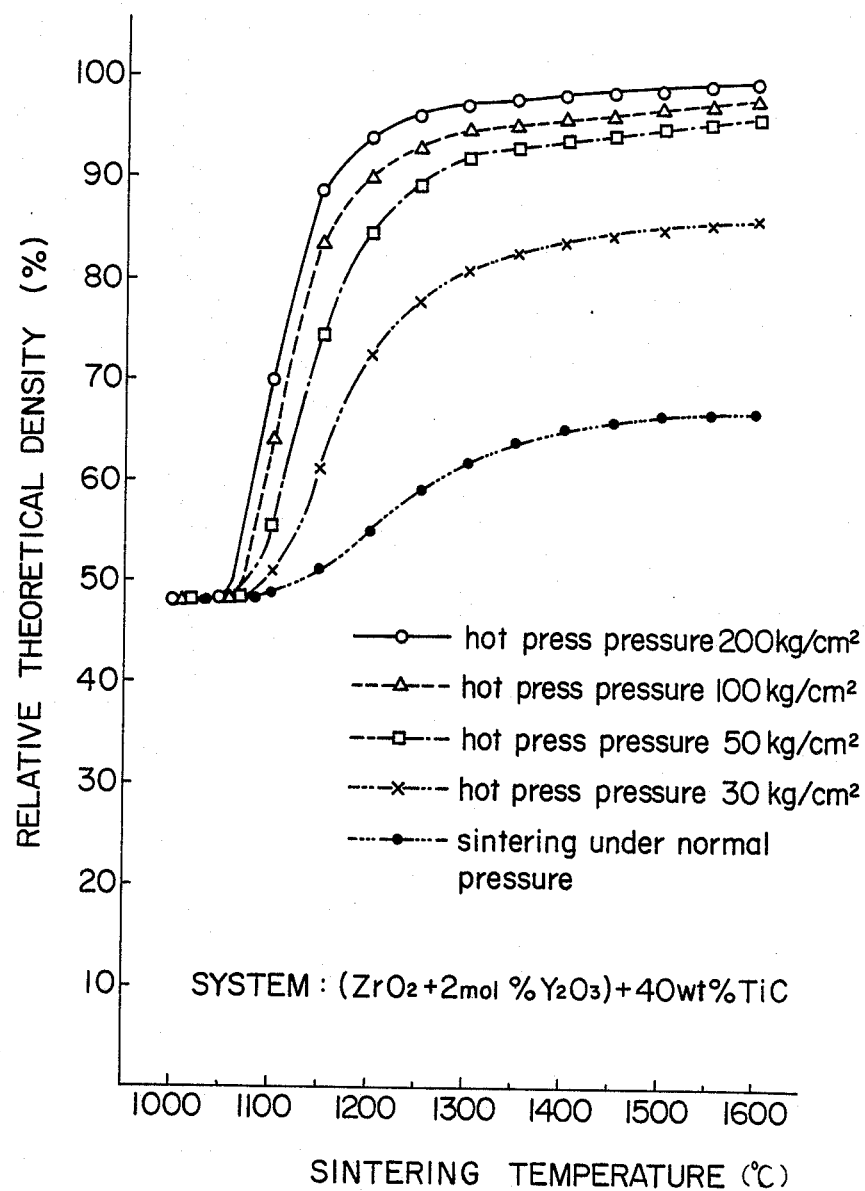
FIG. 2 is a graph showing the relationship of the relative theoretical density (i.e., relative density against the theoretical density, %) versus the sintering temperature (°C., abscissa) for one embodiment of a system: ($ZrO_2+2$ mol. % $Y_2O_3$)+40 wt % TiC.

As shown in FIG. 2, the sintering is effective at 1300°–1600° C., preferably 1400°–1600° C., while the pressure to be applied during the sintering is effective at 50 kg/cm$^2$ or higher, preferably at 100 kg/cm$^2$ or higher, respectively for achieving the relative theoretical density of at least 90%.

The stabilizer used may be known as such in the art, and includes, for instances, $Y_2O_3$, CaO, MgO, $Yb_2O_3$, CeO, or the like, or a mixture of two or more thereof. Particular preference is given to $Y_2O_3$, CaO and MgO or a mixture thereof. The proportion of the stabilizer in the component A is no more than 14 mol. %, the mol. % being based on $YO_{1.5}$, CaO, MgO, $YbO_{1.5}$ and CeO, since the cubic system is primarily formed at 16 mol. % or more. An effective amount of the stabilizer is no less than 2 mol. %, the mol. % being as above, below which the monoclinic system is dominant.

The present invention will now be elucidated in detail with reference to the following non-restrictive examples.

It should be understood that following Examples are being presented for better elucidation of the present invention and not for limitative purpose, and that any modifications or changes as apparent in the art may be done without departing from the inventive concept.

EXAMPLE 1

Two mol. % $Y_2O_3$ having a specific surface area of 13.5 m$^2$/g was added as a stabilizer to monoclinic $ZrO_2$ as specified in Table 1. As a material to be dispersed, finely divided $Al_2O_3$ having a mean particle size of 0.1 micron and a purity of 99.9% or TiC having a mean particle size of 1.2 microns and a purity of 99.5% was further added in the proportions as specified in Table 2. The resultant mixture was wet-milled together, dried, powdered, and charged in a carbon mold where hot-pressing was effected under the conditions of 200 kg/cm$^2$ and 1500°–1600° C. for about 1 hour resulting in a sintered mass of 30×30×4.5 mm size. Thereafter, the sintered mass was cut to a 4×8×25 mm size and ground for the measurement of its various properties (see Table 2). Although the mean grain size was no more than 3 microns in all the runs, it was found that, when a higher sintering temperature was applied, grain growth took place so that the mean grain size increased to more than 3 microns with a sharp drop of strength. As is evident from Table 2, it has been found that the density of the sintered masses reaches approximately the theoretically possible value. It has also been found that, by the addition of $Al_2O_3$, a tetragonal-to-monoclinic transformation is so limited that the amount of the residual tetragonal system is larger than is the case at normal-pressure sintering, thus leading to significant improved strength and toughness. It has further been found that similar results are obtainable by the addition of TiC. In Sample Nos. 7R and 13R wherein 80% of $Al_2O_3$ of TiC were added, however, the content of $ZrO_2$ is so low that both strength and toughness are unsatisfactory.

EXAMPLE 2

Zirconium oxychloride (0.5 mol/l) and yttrium chloride (0.5 mol/l) were mixed together in an aqueous solution, and co-precipitated therefrom. The co-precipitate was calcined at 800° C. to obtain powdery $ZrO_2$ containing 2 mol. % of $Y_2O_3$, the properties of which are shown in Table 3. With the addition of $Al_2O_3$, this powder was processed according to the procedures of Example 1 to obtain sintered masses. The results are set forth in Table 4.

As will be appreciated from those results, the addition of $Al_2O_3$ is also effective in the case of using the powdery co-precipitate of $ZrO_2$, as is the case with Example 1.

No. 410. Evaluation was made by the three-point bend notch method of 20-millimeter span in terms of the mean value on the measurements of five test pieces.

3. Hardness HR45N was determined on a Rockwell superficial tester under a load of 45 kg.

4. Crystal System was determined with a RAD-rA type Geiger Flex (made by RIGAKU DENKI) by X-ray diffraction. In the first place, by X-ray diffraction of a specimen which had been mirror-polished with a 15 microns diamond paste, the integrated strength Im of each of the (1Ī1) plane and the (111) plane of monoclinic $ZrO_2$, the integrated strength. It of the (111) plane of tetragonal $ZrO_2$, and the integrated strength Ic of the (111) plane of cubic $ZrO_2$ were measured, and the fraction of monoclinic $ZrO_2$ was determined by the ratio of $Im/(Im+It+Ic)$. Subsequently, the sintered mass was pulverized to a degree that it passed entirely through a 325-mesh sieve, and again subjected to X-ray diffraction under the same conditions to determine the integrated strength, I'm and I'c, of monoclinic and cubic $ZrO_2$. As it was then considered correct to suppose that the residual tetragonal $ZrO_2$ in the sintered mass receives a mechanical stress by pulverization, and is completely transformed into monoclinic $ZrO_2$, the amount of cubic $ZrO_2$ was deterined through a ratio $I'c/(I'm+I'c)$ then, tetragonal $ZrO_2$ was determined.

Note 2—A suffix R in the tables stands for a comparison run.

TABLE 1

| Crystal System | Monoclinic System |
|---|---|
| Specific Surface Area | 25 m²/g |
| Chemical Composition | (wt %) |
| $ZrO_2$ (including $HfO_2$) | no less than 99% (including 3 to 5% $HfO_2$) |
| $SiO_2$ | 0.5% |
| CaO | 0.06% |
| $Fe_2O_3$ | 0.1% |
| $TiO_2$ | 0.25% |

TABLE 3

| Crystal System | Tetragonal System |
|---|---|
| Specific Surface Area | 32 m²/g |
| Chemical Composition | (wt %) |
| $ZrO_2$ (including $HfO_2$) | 95% (including 3 to 5% $HfO_2$) |
| $Y_2O_3$ | 4.04% |
| CaO | 0.09% |
| $Na_2O$ | 0.05% |

TABLE 2

| | composition | | | | | | | | | |
|---|---|---|---|---|---|---|---|---|---|---|
| | Stabilizer in A component | | B component | | Sintering | | Bending | Toughness | Crystal System of $ZrO_2$ | | |
| Sample | | Amount | | Amount | Temperature | Density | Strength | $K_{IC}$ | (wt. %) | | |
| Nos. | Type | (mol. %) | Type | (wt. %) | (°C.) | (g/cm³) | (kg/mm²) | (kg/mm^{3/2}) | Monoclinic | Tetragonal | Cubic |
| 1R | $Y_2O_3$ | 2 | $Al_2O_3$ | 0.1 | 1500 | 5.85 | 40.1 | 17.5 | 27 | 56 | 17 |
| 2R | " | " | " | 0.5 | " | 5.88 | 82.6 | 39.6 | 9 | 76 | 15 |
| 3R | " | " | " | 3 | " | 5.97 | 128.3 | 45.1 | 5 | 83 | 12 |
| 4R | " | " | " | 10 | " | 5.75 | 133.0 | 48.7 | 4 | 85 | 11 |
| 5R | " | " | " | 40 | " | 5.00 | 162.3 | 51.5 | 0 | 93 | 7 |
| 6R | " | " | " | 70 | 1600 | 4.43 | 100.4 | 36.4 | 0 | 95 | 5 |
| 7R | " | " | " | 80 | " | 4.26 | 57.9 | 19.3 | 0 | 95 | 5 |
| 8 | " | " | TiC | 0.5 | 1500 | 5.89 | 81.3 | 35.3 | 10 | 76 | 14 |
| 9 | " | " | " | 3 | " | 6.01 | 108.8 | 40.2 | 7 | 82 | 11 |
| 10 | " | " | " | 10 | " | 5.92 | 112.7 | 43.4 | 6 | 85 | 9 |
| 11 | " | " | " | 40 | " | 5.53 | 137.6 | 45.9 | 0 | 94 | 6 |
| 12 | " | " | " | 70 | 1600 | 5.19 | 85.1 | 32.4 | 0 | 94 | 6 |
| 13R | " | " | " | 80 | " | 5.09 | 49.1 | 17.2 | 0 | 95 | 5 |

Note 1—Measurement of Physical Properties

1. Bending Strength was measured according to JIS B 4104. Estimation was made in terms of the mean value on the measurements of five test pieces.

2. Fractue Toughness $K_{IC}$ was measured with a 4 (width)×5 (thickness)×25 (length) mm test piece having a notch with a depth of 0.5 mm and a width of 0.15 mm according to ASTM Special Technical Publication

TABLE 4

| | composition | | | | | | | | | |
|---|---|---|---|---|---|---|---|---|---|---|
| | Stabilizer in A component | | B component | | Sintering | | Bending | Toughness | Crystal System of $ZrO_2$ | | |
| Sample | | Amount | | Amount | Temperature | Density | Strength | $K_{IC}$ | (wt. %) | | |
| Nos. | Type | (mol. %) | Type | (Wt. %) | (°C.) | (g/cm³) | (kg/mm²) | (kg/mm^{3/2}) | Monoclinic | Tetragonal | Cubic |
| 14R | $Y_2O_3$ | 2 | $Al_2O_3$ | 0.5 | 1500 | 6.06 | 134.8 | 39.7 | 7 | 82 | 11 |
| 15R | " | " | " | 3 | " | 6.00 | 147.6 | 45.1 | 4 | 85 | 11 |
| 16R | " | " | " | 10 | " | 5.79 | 156.9 | 48.8 | 2 | 89 | 9 |
| 17R | " | " | " | 40 | " | 5.03 | 170.5 | 51.7 | 0 | 96 | 4 |

TABLE 4-continued

| Sample Nos. | composition | | | | Sintering Temperature (°C.) | Density (g/cm³) | Bending Strength (kg/mm²) | Toughness $K_{IC}$ (kg/mm$^{3/2}$) | Crystal System of ZrO₂ (wt. %) | | |
|---|---|---|---|---|---|---|---|---|---|---|---|
| | Stabilizer in A component | | B component | | | | | | | | |
| | Type | Amount (mol. %) | Type | Amount (Wt. %) | | | | | Monoclinic | Tetragonal | Cubic |
| 18R | " | " | " | 70 | 1600 | 4.45 | 120.7 | 36.5 | 0 | 98 | 2 |
| 19R | " | " | " | 80 | " | 4.29 | 66.5 | 20.1 | 0 | 98 | 2 |

EXAMPLE 3

Y₂O₃, CaO and MgO were incorporated as stabilizers to the monoclinic ZrO₂ as specified in Table 1 in the proportions as mentioned in Table 5. Finely divided Al₂O₃ having a purity of 99.9% and a mean particle size of 0.1 micron was further added as the dispersant material (component B) in an amount of 40 wt.%. Example 1 was substantially repeated to obtain sintered masses (for the results, refer to Table 5). These results turn out that the crystal phase of ZrO₂ varies depending upon the type and amount of the stabilizer used, and reveal that any ceramic sintered mass, wherein the proportion of monoclinic, tetragonal and cubic systems departs from the scope as defined in the appended claims, has markedly reduced strength and toughness.

size: 1.5 micron), SiC (purity: 96%, mean particle size: 0.7 micron), Si₃N₄ (purity: 96.5%, mean particle size; 0.5 micron) and WC (purity: 99.5%, mean particle size: 1.5 micron) as well as double component systems of Al₂O₃/TiC, Al₂O₃/SiC and Al₂O₃/Si₃N₄ were used. The results obtained are given in Table 6. As understood from those results, it has been found that the incorporation of these materials has an effect similar to that attained in the incorporation of Al₂O₃. Table 6 also indicates that the hardness of the obtained sintered masses is significantly larger than that of the sintered mass of ZrO₂ alone, and higher than that of the Al₂O₃ - containing mass.

TABLE 6

| Sample Nos. | composition | | | | Sintering Temperature (°C.) | Density (g/cm³) | Bending Strength (kg/mm²) | Toughness $K_{IC}$ (kg/mm$^{3/2}$) | Hardness HR45N | Thermal Shock Resistance ΔT (°C.) |
|---|---|---|---|---|---|---|---|---|---|---|
| | Stabilizer in A component | | B component | | | | | | | |
| | Type | Amount (mol. %) | Type | Amount (wt. %) | | | | | | |
| 5R | Y₂O₃ | 2 | Al₂O₃ | 40 | 1500 | 5.00 | 162.3 | 51.5 | 87.6 | 350 |
| 11 | " | " | TiC | " | " | 5.53 | 137.6 | 45.9 | 88.1 | 300 |
| 31 | " | " | NbC | " | " | 6.64 | 127.3 | 32.3 | 88.0 | 330 |
| 32 | " | " | TiB₂ | " | " | 5.31 | 121.4 | 31.4 | 88.3 | 380 |
| 33 | " | " | TiN | " | " | 5.77 | 154.8 | 57.9 | 85.8 | 350 |
| 34 | " | " | SiC | " | " | 4.45 | 125.4 | 30.7 | 88.1 | 390 |
| 35 | " | " | Si₃N₄ | " | 1600 | 4.43 | 128.5 | 34.6 | 89.4 | 500 |
| 36 | " | " | WC | " | 1500 | 8.00 | 116.9 | 30.4 | 87.9 | 260 |
| 37 | " | " | Al₂O₃/TiC | 30/10 | " | 5.12 | 156.1 | 46.5 | 87.7 | 400 |
| 38 | " | " | Al₂O₃/TiN | " | " | 5.17 | 160.4 | 53.1 | 87.2 | 400 |
| 39 | " | " | Al₂O₃/SiC | " | " | 4.85 | 153.1 | 46.3 | 87.7 | 430 |
| 40 | " | " | Al₂O₃/Si₃N₄ | " | " | 4.84 | 156.2 | 47.3 | 88.1 | 450 |
| 41R | " | " | Al₂O₃ | 0.1 | " | 5.85 | 40.1 | 17.5 | 84.3 | 100 |

EXAMPLE 5

The hot bending strength of the masses obtained in

TABLE 5

| Sample Nos. | composition | | | | Sintering Temperature (°C.) | Density (g/cm³) | Bending Strength (Kg/mm²) | Toughness $K_{IC}$ (Kg/mm$^{3/2}$) | Crystal System of ZrO₂ (wt. %) | | |
|---|---|---|---|---|---|---|---|---|---|---|---|
| | Stabilizer in A component | | B component | | | | | | | | |
| | Type | Amount (mol %) | Type | Amount (wt. %) | | | | | Monoclinic | Tetragonal | Cubic |
| 20R | Y₂O₃ | 0.5 | Al₂O₃ | 40 | 1400 | collapsed | — | — | 96 | 0 | 4 |
| 21R | " | 1 | " | " | 1500 | 5.01 | 143.6 | 47.3 | 0 | 97 | 3 |
| 22R | " | 2 | " | " | " | 5.00 | 162.3 | 51.5 | 0 | 93 | 7 |
| 23R | " | 3 | " | " | " | 4.99 | 151.7 | 44.2 | 0 | 86 | 14 |
| 24R | " | 4 | " | " | " | 4.99 | 133.0 | 39.7 | 0 | 81 | 19 |
| 25R | " | 5 | " | " | " | 4.97 | 125.6 | 34.1 | 0 | 73 | 27 |
| 26R | " | 6 | " | " | " | 4.95 | 103.2 | 27.3 | 0 | 56 | 44 |
| 27R | " | 7 | " | " | " | 4.94 | 95.5 | 20.5 | 0 | 23 | 77 |
| 28R | " | 8 | " | " | " | 4.93 | 56.4 | 13.7 | 0 | 0 | 100 |
| 29R | MgO | 7 | " | " | " | 4.98 | 109.3 | 31.1 | 0 | 78 | 22 |
| 30R | CaO | 6 | " | " | " | 4.96 | 103.6 | 29.5 | 0 | 75 | 25 |

EXAMPLE 4

To obtain various sintered masses, Example 1 was substantially repeated except that as the component B single component systems of NbC (purity: 99%, mean particle size: 1 micron), TiB₂ (purity: 99.5%, mean particle size: 1.5 micron), TiN (purity: 99%, mean particle size: 1.5 micron), Sample No. 5R of Example 1 and Sample No. 33 of Example 4 as well as a sample of partly stabilized zirconia (Composition No. 2032), a commercially available article manufactured by Corning Glass Works, U.S.A., was measured according to the manner aforementioned. The results are illustrated in FIG. 1 showing a graphical view wherein the solid line denotes Sample No. 5R, the broken line Sample No. 33, and the chained line that commercial sample.

Evidently, the single figure indicates that the inventive products have a significantly high strength even at elevated temperatures up to 1000° C.

EXAMPLE 6

To the monoclinic $ZrO_2$ having the properties as shown in Table 1 were added a stabilizer of 2 mol. % $Y_2O_3$ and as the component B 40% by weight TiC having a purity of 99.5%, a mean particle size of 1.2 microns and the composition of No. 11, Table 2. The resultant mixture was wet-milled, dried and pulverized to a powder. The powder was charged in carbon dies and press-sintered by hot-pressing under various conditions of temperature and pressure for about an hour. As apparent in FIG. 2, a relative density of 92% or more relative to the theoretical density was achieved resulting in a dense sintered body without open pores.

The press-sintering effect can be attained also by other manners such as HIP or the like while a sintered body with a higher density is expected with a higher pressure.

System containing $Al_2O_3$ as component B:

By using the materials as shown in Table 6, thermal shock resistance was evaluated with the resultant sintered bodies, which revealed a significant improvement over the case where $Al_2O_3$ alone is used as the component B, if a mixture of $Al_2O_3$ and other substance(s) TiC, TiN, SiC and/or $Si_3N_4$.

Among them, a most preferred case containing $Al_2O_3$ and $Si_3N_4$ with respect to the thermal shock resistance was investigated in more detail.

EXAMPLE 7

The component B comprised of $Al_2O_3$ and $Si_3N_4$ was fixed at 40% by weight and the ratio of $Al_2O_3/Si_3N_4$ was varied to measure the thermal shock resistance thereon. Less than 4% by weight of $Si_3N_4$ no sufficient effect was observed while at 4%, 5% or more, the effect becomes sufficient, and the thermal shock resistance $\Delta T$ reaches 450° C. or higher at 10% by weight or more, resulting in a far (by 100° C. or more) superior thermal shock resistance than the samples containing $Al_2O_3$ alone as the component B.

Next, in the component B of the system comprised of $Al_2O_3$ plus 10% by weight $Si_3N_4$, the amount of component B was varied to 10, 40 and 70% by weight resulting in significant effect in the thermal shock resistance in comparison with the $Al_2O_3$ alone system.

Measurement of the thermal shock resistance: A bending test sample piece with the size of $4\times 8\times 25$ mm was heated to a temperature Tx° C., then allowed to fall into water of T° C. to be quenched followed by bending measuring according to JIS B4104. The heating temperature Tx° C. where the bending strength begins to lower was read as a critical temperature Tc° C. A difference of $\Delta T$(°C.)$= Tc - T$ was made an index of the thermal shock resistance.

TABLE 7

| | Composition | | | | | | | | Thermal |
|---|---|---|---|---|---|---|---|---|---|
| | Stabilizer in A component | | B component | | Sintering | | Bending | Toughness | | Shock Resistance |
| Sample Nos. | Type | Amount (mol. %) | Type | Amount (wt. %) | Temperature (°C.) | Density (g/cm³) | Strength (kg/mm²) | $K_{IC}$ (kg/mm$^{3/2}$) | Hardness HR45N | $\Delta T$ (°C.) |
| 5R | $Y_2O_3$ | 2 | $Al_2O_3$ | 40 | 1500 | 5.00 | 162.3 | 51.5 | 87.6 | 350 |
| 42R | " | " | $Al_2O_3/Si_3N_4$ | 39/1 | " | 4.98 | 161.7 | 51.0 | 87.7 | 360 |
| 43 | " | " | " | 35/5 | " | 4.92 | 159.5 | 49.4 | 87.9 | 400 |
| 40 | " | " | " | 30/10 | " | 4.84 | 156.2 | 47.3 | 88.1 | 450 |
| 44 | " | " | " | 20/20 | " | 4.70 | 148.6 | 43.1 | 88.6 | 490 |
| 45 | " | " | " | 10/30 | 1600 | 4.56 | 138.8 | 38.8 | 89.0 | 510 |
| 35 | " | " | $Si_3N_4$ | 40 | " | 4.43 | 128.5 | 34.6 | 89.4 | 500 |
| 46 | " | " | $Al_2O_3/Si_3N_4$ | 0.1/10 | 1500 | 5.55 | 115.3 | 44.7 | 86.8 | 370 |
| 40 | " | " | " | 30/10 | " | 4.84 | 156.2 | 47.3 | 88.1 | 450 |
| 47 | " | " | " | 60/10 | 1600 | 4.30 | 98.4 | 34.6 | 89.1 | 300 |
| 4R | " | " | $Al_2O_3$ | 10 | 1500 | 5.75 | 133.0 | 48.7 | 85.1 | 320 |
| 5R | " | " | " | 40 | " | 5.00 | 162.3 | 51.5 | 87.6 | 350 |
| 6R | " | " | " | 70 | 1600 | 4.43 | 100.4 | 36.4 | 88.8 | 210 |

What is claimed is:

1. A ceramic press-sintered mass of high toughness consisting essentially of 30–99.5% by weight of a component A as defined below and the balance being a component B as defined below, and having a mean grain size of no more than 3 microns as a whole:

Component A:

zirconia having a tetragonal and/or cubic system content of no less than 90% by weight, with the proviso that the tetragonal/cubic system ratio by weight is no less than 0.25, said zirconia including a stabilizer consisting of one or more selected from the group consisting of $Y_2O_3$, CaO, MgO, $Yb_2O_3$ and CeO; and Component B:

one, or a mixture of two or more substances selected from the group consisting of borides, carbides and nitrides of Al, Si and an element in the groups 4a, 5a and 6a of the periodic table.

2. A ceramic press-sintered mass as defined in claim 1, in which the ceramic press-sintered mass was press-sintered at 1300°–1600° C. under a pressure of 50 kg/cm² or higher.

3. A ceramic press-sintered mass as defined in claim 1, in which as the component A, use is made of a material obtained by uniformly mixing water-soluble salts of zirconium and the stabilizer in a given proportion in an aqueous solution, followed by co-precipitation therefrom.

4. A ceramic press-sintered mass as defined in claim 1, in which $ZrO_2$ is partly or wholly replaced with $HfO_2$.

5. A ceramic press-sintered mass as defined in claim 1, in which the component B is one, or a mixture of two or more substances selected from the group consisting of TiC, NbC, $TiB_2$, TiN, SiC, $Si_3N_4$ and WC.

6. A ceramic press-sintered mass as defined in claim 5, in which the component B is one, or a mixture of two or more substances selected from the group consisting of TiC, TiN, SiC and $Si_3N_4$.

7. A ceramic press-sintered mass as defined in claim 1, in which the component A includes 2 to 14 mol. % of the stabilizer, the mol. % being based on $YO_{1.5}$, CaO, MgO, $YbO_{1.5}$ and CeO.

8. A ceramic press-sintered mass as defined in claim 7, in which the stabilizer for the component A is one or more of $Y_2O_3$, CaO and MgO.

9. A ceramic press-sintered mass of high toughness consisting essentially of 30–99.5% by weight of a component A as defined below and the balance being components B and C as defined below, and having means grain size of no more than 3 microns as a whole:
Component A:
zirconia having a tetragonal and/or cubic system content of no less than 90% by weight, with the proviso that the tetragonal/cubic system ratio by weight is no less than 0.25, said zirconia including a stabilizer consisting of one or more selected from the group consisting of $Y_2O_3$, CaO, MgO, $Yb_2O_3$ and CeO;
Component B:
one, or a mixture of two or more substances selected from the group consisting of borides, carbides and nitrides of Al, Si, and an element in the groups 4a, 5a and 6a of the periodic table; and
Component C:
3% by weight or less of $SiO_2$, 0.5% by weight or less of $Fe_2O_3$ and/or 0.5% by weight or less of $TiO_2$, provided that the component C amounts to no more than 3% by weight in said sintered mass.

10. A ceramic press-sintered mass as defined in claim 9, in which the ceramic press-sintered mass was press-sintered at 1300°–1600° C. under a pressure of 50 kg/cm$^2$ or higher.

11. A ceramic press-sintered mass as defined in claim 9, in which as the component A, use is made of a material obtained by uniformly mixing water-soluble salts of zirconium and the stabilizer in a given proportion in an aqueous solution, followed by co-precipitation therefrom.

12. A ceramic press-sintered mass as defined in claim 9, in which $ZrO_2$ is partly or wholly replaced with $HfO_2$.

13. A ceramic press-sintered mass as defined in claim 9, in which the component B is one, or a mixture of two or more substances selected from the group consisting of TiC, NbC, $TiB_2$, TiN, SiC, $Si_3N_4$ and WC.

14. A ceramic press-sintered mass as defined in claim 13, in which the component B is one, or a mixture of two or more substances selected from the group consisting of TiC, TiN, SiC and $Si_3N_4$.

15. A ceramic press-sintered mass as defined in claim 9 in which the A component includes 2 to 14 mol. % of the stabilizer, the mol. % being based on $YO_{1.5}$, CaO, MgO, $YbO_{1.5}$ and CeO.

16. A ceramic press-sintered mass of high toughness as defined in claim 15, in which the stabilizer for the component A is one or more of $Y_2O_3$, CaO and MgO.

17. A ceramic press-sintered mass of high toughness consisting essentially of 30–95% by weight of a component A as defined below and the balance being a component B as defined below, and having a mean grain size of no more than 3 microns as a whole:
Component A:
zirconia having a tetragonal and/or cubic system content of no less than 90% by weight, with the proviso that the tetragonal/cubic system ratio by weight is no less than 0.25, said zirconia including a stabilizer consisting of one or more selected from the group consisting of $Y_2O_3$, CaO, MgO, $Yb_2O_3$ and CeO; and
Component B:
a mixture of $Al_2O_3$ and at least one substance selected from the group consisting of borides, carbides and nitrides of Al, Si and an element in the groups 4a, 5a and 6a of the periodic table, wherein said substance is present 4% by weight or more and $Al_2O_3$ is present 0.1% by weight or more respectively, of the whole components.

18. A ceramic press-sintered mass as defined in claim 17, in which the ceramic press-sintered mass was press-sintered at 1300°–1600° C. under a pressure of 50 kg/cm$^2$ or higher.

19. A ceramic press-sinered mass as defined in claim 17, in which as the component A, use is made of a material obtained by uniformly mixing water-soluble salts of zirconium and the stabilizer in a given proportion in an aqueous solution, followed by co-precipitation therefrom.

20. A ceramic press-sintered mass as defined in claim 17, in which $ZrO_2$ is partly or wholly replaced with $HfO_2$.

21. A ceramic press-sintered mass as defined in claim 17, in which the component B is a mixture of $Al_2O_3$ and at least one substance selected from the group consisting of TiC, NbC, $TiB_2$, TiN, SiC, $Si_3N_4$ and WC.

22. A ceramic press-sintered mass as defined in claim 21, in which said substance of component B is at least one selected from the group consisting of TiC, TiN, SiC and $Si_3N_4$.

23. A ceramic press-sintered mass as defined in claim 17 in which the component A includes 2 to 14 mol. % of the stabilizer, the mol. % being based on $YO_{1.5}$, CaO, MgO, $YbO_{1.5}$ and CeO.

24. A ceramic press-sintered mass as defined in claim 23, in which the stabilizer for the component A is one or more of $Y_2O_3$, CaO and MgO.

25. A ceramic press-sintered mass of high toughness consisting essentially of 30–95% by weight of a component A as defined below and the balance being components B and C as defined below, and having mean grain size of no more than 3 microns as a whole:
Component A:
zirconia having a tetragonal and/or cubic system content of no less than 90% by weight, with the proviso that the tetragonal/cubic system ratio by weight is no less than 0.25, said zirconia including a stabilizer consisting of one or more selected from the group consisting of $Y_2O_3$, CaO, MgO, $Yb_2O_3$ and CeO;
Component B:
a mixture of $Al_2O_3$ and at least one substance selected from the group consisting of borides, carbides and nitrides of Al, Si and an element in the groups 4a, 5a and 6a of the periodic table, wherein said substance is present 4% by weight or more and $Al_2O_3$ is present 0.1% by weight or more, respectively, of the whole components; and
Component C:
3% by weight or less of $SiO_2$, 0.5% by weight or less of $Fe_2O_3$ and/or 0.5% by weight or less of $TiO_2$, provided that the component C amounts to no more than 3% by weight in said sintered mass.

26. A ceramic press-sintered mass as defined in claim 25, in which the ceramic press-sintered mass was press-sintered at 1300°-1600° C. under a pressure of 50 kg/cm² or higher.

27. A ceramic press-sintered mass as defined in claim 25, in which as the component A, use is made of a material obtained by uniformly mixing water-soluble salts of zirconium and the stabilizer in a given proportion in an aqueous solution, followed by co-precipitation therefrom.

28. A ceramic press-sintered mass as defined in claim 25, in which $ZrO_2$ is partly or wholly replaced with $HfO_2$.

29. A ceramic press-sintered mass as defined in claim 25, in which the component B is a mixture of $Al_2O_3$ and at least one substance selected from the group consisting of TiC, NbC, $TiB_2$, TiN, SiC, $Si_3N_4$ and WC.

30. A ceramic press-sintered mass as defined in claim 29, in which said substance of the component B is at least one selected from the group consisting of TiC, TiN, SiC and $Si_3N_4$.

31. A ceramic press-sintered mass as defined in claim 25 in which the A component includes 2 to 14 mol. % of the stabilizer, the mol. % being based on $YO_{1.5}$, CaO, MgO, $YbO_{1.5}$ and CeO.

32. A ceramic press-sintered mass of high toughness as defined in claim 31, in which the stabilizer for the component A is one or more of $Y_2O_3$, CaO and MgO.

* * * * *